(12) United States Patent
Ribes Martí

(10) Patent No.: US 12,540,639 B2
(45) Date of Patent: Feb. 3, 2026

(54) FASTENING CLIP

(71) Applicant: Illinois Tool Works Inc., Glenview, IL (US)

(72) Inventor: Òscar Ribes Martí, Sabadell (ES)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 18/227,687

(22) Filed: Jul. 28, 2023

(65) Prior Publication Data

US 2024/0060522 A1 Feb. 22, 2024

(30) Foreign Application Priority Data

Aug. 22, 2022 (EP) .................................... 22382792
Oct. 24, 2022 (EP) .................................... 22383022

(Continued)

(51) Int. Cl.
*F16B 21/07* (2006.01)
*F16B 2/24* (2006.01)

(52) U.S. Cl.
CPC ............ *F16B 21/075* (2013.01); *F16B 2/245* (2013.01)

(58) Field of Classification Search
CPC ........ F16B 2/243; F16B 21/075; F16B 2/245; F16B 5/0642; F16B 21/086; B60R 21/21;

(Continued)

(56) References Cited

U.S. PATENT DOCUMENTS 7,900,953 B2 * 3/2011 Slobodecki ........... B60R 21/215
280/730.2
8,474,111 B2 * 7/2013 Ribes Marti .......... F16B 5/0621
24/294

(Continued)

FOREIGN PATENT DOCUMENTS

DE 112019006152 T5 8/2021

OTHER PUBLICATIONS

The extended European search report for Application No. 23184318.6, dated Jan. 4, 2024, European Patent Office, Germany (7 pages).

*Primary Examiner* — Jason W San
*Assistant Examiner* — Louis A Mercado
(74) *Attorney, Agent, or Firm* — McAndrews, Held & Malloy, Ltd.

(57) ABSTRACT

A fastening clip for mounting a component part, such as an airbag or a luggage ring, to a support structure. The fastening clip includes a body portion which extends between an upper end region and a lower end region along a longitudinal axis. The body portion includes at least one elastically deflectable retaining member. The at least one elastically deflectable retaining member projects laterally from the lower end region of the body portion, so as to fixingly engage when inserted into an orifice of the support structure. Each elastically deflectable retaining member includes a U-shaped limb. Each U-shaped limb includes a first portion extending in a generally longitudinal plane relative to the longitudinal axis, a second portion spaced apart from the first portion and extending in a generally longitudinal plane relative to the longitudinal axis and a third portion extending from at least one of the first portion and the second portion in a transverse plane relative to the longitudinal axis.

17 Claims, 8 Drawing Sheets

(30) Foreign Application Priority Data

Feb. 15, 2023 (EP) ..................................... 23382136
Jul. 7, 2023 (EP) ..................................... 23184318

(58) Field of Classification Search
CPC .. B60R 7/04; B60R 21/20; B60R 7/08; B60R 2021/0006; B60P 7/0807
See application file for complete search history.

(56) References Cited

U.S. PATENT DOCUMENTS

| | | | |
|---|---|---|---|
| 8,646,155 B2* | 2/2014 | Ribes Marti | F16B 5/125 |
| | | | 24/295 |
| 9,009,928 B2* | 4/2015 | Binkert | F16B 2/24 |
| | | | 403/345 |
| 10,408,247 B2 | 9/2019 | Schulz | |
| 10,800,371 B2* | 10/2020 | Marini | F16B 21/065 |
| 11,384,779 B2* | 7/2022 | Binkert | B60R 21/16 |
| 11,441,587 B2* | 9/2022 | Binkert | F16B 21/086 |
| 11,519,437 B2* | 12/2022 | Binkert | F16B 2/243 |
| 2020/0392973 A1* | 12/2020 | Ammann | F16B 2/243 |
| 2022/0228611 A1* | 7/2022 | Cobacho | B60R 21/213 |
| 2024/0018983 A1* | 1/2024 | Murray | F16B 45/002 |

* cited by examiner

FASTENING CLIP

RELATED APPLICATIONS

The present application claims the benefit of European Patent Application No. EP 22382792.4, filed Aug. 22, 2022; European Patent Application No. EP 22383022.5, filed Oct. 24, 2022; European Patent Application No. EP 23382136.2, filed Feb. 15, 2023; and European Patent Application No. EP 23184318.6, filed Jul. 7, 2023, the contents of which are hereby incorporated by reference.

BACKGROUND

In the automotive industry, fastening clips are used to mount components, structures or panels to the frame of a vehicle.

Airbags are safety devices that are increasingly being used in the motor industry and which, in combination with other safety components, such as seatbelts, help to reduce fatal accidents in the case of collisions. The tests to which the vehicles have been subjected, as well as, mortality statistics, have clearly demonstrated that the use of airbags can considerably improve the safety of automobile occupants and, when combined with other forms of passive safety, such as seat belts, significantly (by about 30%) reduce mortality in the case of serious accidents.

Today, manufacturers produce frontal airbags, which are designed to protect the driver and/or passenger in the event of a head-on collision and, considering their positions, lateral airbags that are installed behind the posts and/or in the sides of the vehicle seats, along with curtain airbags.

Airbags of the curtain type are usually located in the part close to the roof on the sides of the automobile, e.g. situated above the front and rear doors. Such airbags have very rigorous requirements with regard to the goals set for them and the technical challenges that have to be overcome. Typical challenges may be their location in the vehicle and the way they are fastened, required deployment time and the time that the airbag is required to remain inflated. Other challenges may come from the fact that there is only a short distance between the body and the occupant and that there is little vehicle material between the occupant and an impacting vehicle. For example, it is essential that airbags are deployed in a fraction of a second, giving rise to an enormous snatch force on their attachment components, which then suffer the consequences of that impact.

SUMMARY

The present disclosure generally relates to the field of fasteners and in particular, to the field of fastening clips for attaching one or more components as set forth more completely in the claims, such as airbag devices or luggage rings, to an external structure. More specifically, the present disclosure relates to an improved fastening clip for attaching a side-impact airbag or curtain-type airbag or a luggage ring to a vehicle structure.

DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

DETAILED DESCRIPTION

Figure 1:
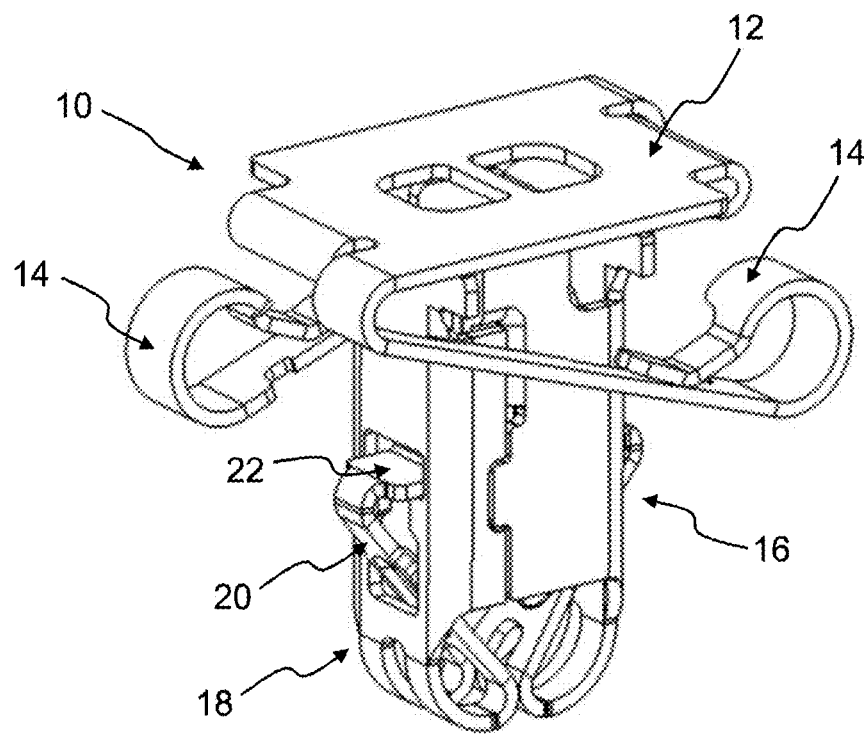
FIG. 1 is a perspective illustration of a fastening clip used for attaching components, such as airbags, to a vehicle chassis.

The described example embodiments relate to fastening clips suitable for securing paraphernalia and accessories. The embodiments of the disclosure are normally applied in vehicles. Although the disclosure is described with respect to vehicles, the disclosure is not restricted to vehicles altogether, but may also be used in other structures requiring attachment of accessories or peripheral components to a structure.

Certain terminology is used in the following description for convenience only and is not limiting. The words 'right', 'left', 'lower', 'upper', 'front', 'rear', 'upward', 'down' and 'downward' designate directions in the drawings to which reference is made and are with respect to the described component when assembled and mounted. The words 'inner', 'inwardly' and 'outer', 'outwardly' refer to directions toward and away from, respectively, a designated centerline or a geometric center of an element being described (e.g. central axis), the particular meaning being readily apparent from the context of the description.

Further, as used herein, the terms 'connected', 'attached', 'coupled', 'mounted' are intended to include direct connections between two members without any other members interposed therebetween, as well as, indirect connections between members in which one or more other members are interposed therebetween. The terminology includes the words specifically mentioned above, derivatives thereof, and words of similar import.

Further, unless otherwise specified, the use of ordinal adjectives, such as, "first", "second", "third" etc. merely indicate that different instances of like objects are being referred to and are not intended to imply that the objects so described must be in a given sequence, either temporally, spatially, in ranking or in any other manner.

According to a first aspect of the present disclosure, there is provided a fastening clip for mounting a component part, such as an airbag or a luggage ring, to a support structure, the fastening clip comprising: a body portion, extending between an upper end region and a lower end region along a longitudinal axis, wherein the body portion comprises at least one elastically deflectable retaining member, projecting laterally from said lower end region of said body portion, so as to fixingly engage when inserted into an orifice of the support structure; wherein each elastically deflectable retaining member includes a U-shaped limb, each U-shaped limb comprising a first portion extending in a generally longitudinal plane relative to said longitudinal axis, a second portion spaced apart from the first portion and extending in a generally longitudinal plane relative to said longitudinal axis and a third portion extending from at least one of the first portion and the second portion in a transverse plane relative to said longitudinal axis.

The fastening clip of the present disclosure provides the advantage of a bearing surface having an increased surface area without any exposed sharp edges that may damage other components, e.g. a panel, during use, for example insertion of the fastening clip into a panel. The applicant has surprisingly found that the pull-out force of the fastening clip of the present disclosure is increased by around 30%, while the construction still allows the use of a single (uniaxial) folded (and punched) laminar sheet material (e.g. metal).

Advantageously, each elastically deflectable retaining member may include an opening through which said U-shaped limb extends.

Advantageously, the third portion may extend from the first portion such that the first portion and the third portion define an L-shaped limb portion. The second portion may define an I-shaped limb portion. The L-shaped limb portion and the I-shaped limb portion may together define the U-shaped limb. The third portion may define a bearing surface against which the support structure bears, in use Advantageously, each U-shaped limb may include a fourth portion extending from at least one of the first portion and the second portion in the transverse plane relative to said longitudinal axis.

The L-shaped limb portion may be a first L-shaped limb portion. Advantageously, the fourth portion may extend from the second portion such that the second portion and the fourth portion define a second L-shaped limb portion.

Advantageously, the transverse plane of the third portion and the transverse plane of the fourth portion may be a common plane.

Advantageously, the third portion and the fourth portion may define a bearing surface, against which the support structure bears in use.

Advantageously, the fastening clip may further include a stop member. The stop member may include a sloped wall. The sloped wall may extend from the lower end region of the body toward the opening.

Advantageously, the first portion and/or the second portion may comprise a lower notch region adjacent to the stop member. The lower notch region may be a notch or an indentation or a cut-out.

The lower notch region, for example the notch or indentation, may extend upwardly toward the upper end region of the body portion and may, for example, define a recess. The recess may be configured to receive an upper portion of the stop member.

The lower notch region, for example the notch or indentation, may include a foot. The foot may be configured to abut a lower portion of the stop member. A portion of the foot may, for example, contact a lower portion of the stop member.

Advantageously, the fastening clip may further include a head portion. The head portion may be provided at said upper end region of said body portion. The head portion may have a flat upper surface extending in a transverse plane relative to said longitudinal axis.

Advantageously, said body portion and said head portion may be formed from a single piece.

FIG. 1 illustrates a clip 10 used for the attachment of airbags, such as side-impact or curtain airbags. The clip 10 has a head portion 12 from which extend flexible elements, such as spring elements 14, that, during use, are adapted to bear against an outer surface of an attachment panel when the clip 10 enters an aperture of the panel. The clip 10 also has a body portion 16, including descending tangs 18 which give rise to different structures of the clip 10, such as, for example, side limbs 20 having surfaces 22 configured to bear against an inner surface of the panel in such a way that the supporting surfaces 22 and those provided by the flexible spring elements 14 engage the attachment panel on both sides, i.e. in the form of a sandwich, thus enabling the clip 10 to be fixedly supported on the panel. The clip 10 may be formed from a single folded and punched laminar surface, so as to form a three-dimensional body made from, for example, metal, such as, carbon steel.

Since an airbag deploys in a few thousandths of a second, reaching an expansion speed that is approximately equivalent to 300 Km/h, the forces involved in the firing of the airbag are enormous and act on the support elements of the mechanism and thus on the fastening clips of the airbags. The shaking involved in the expansion of the airbag exerts a heavy outward traction force on the panel that acts directly on the above-mentioned clips which must, however, withstand it without damaging the ball/curtain or the panel to which they are attached. There is, therefore, a desire to increase the pull-out force which fastening clips, such as clip 10, can withstand. There is also a desire to reduce the risk of elements of the clips, e.g. edges, causing damage to the panel to which it is attached.

Another type of fastening clip for use in a storage compartment of a vehicle, is embedded to a base panel or a side panel of the storage compartment. Such a fastening clip is located at a fixed point, or more often, multiple fixed points, of the storage compartment. The fastening clip(s) is connected to a luggage ring, onto which loose objects such as shopping bags or items are attached so that they do not move around the storage compartment when the vehicle is in motion.

Figure 2:
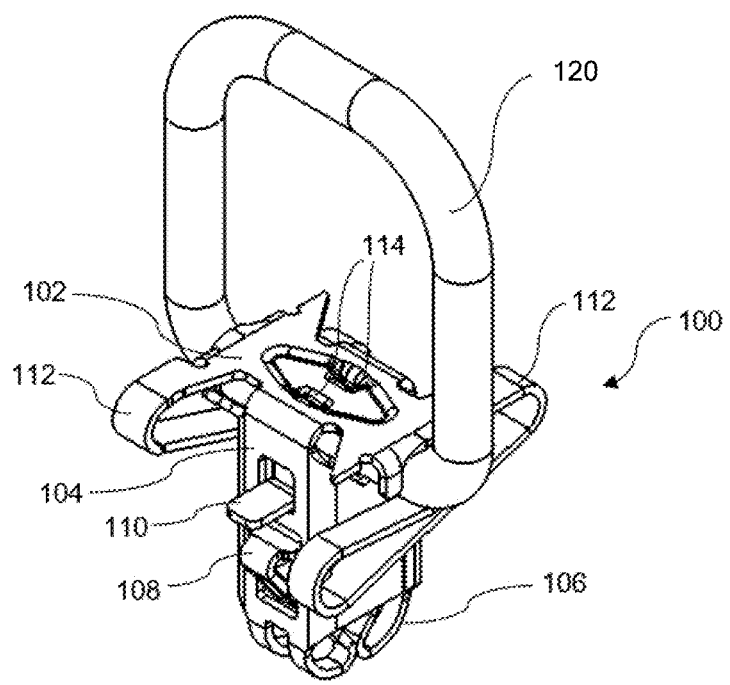
FIG. 2 is a perspective illustration of another fastening clip used for attaching components, such as luggage rings, to a vehicle chassis.
Figure 3:
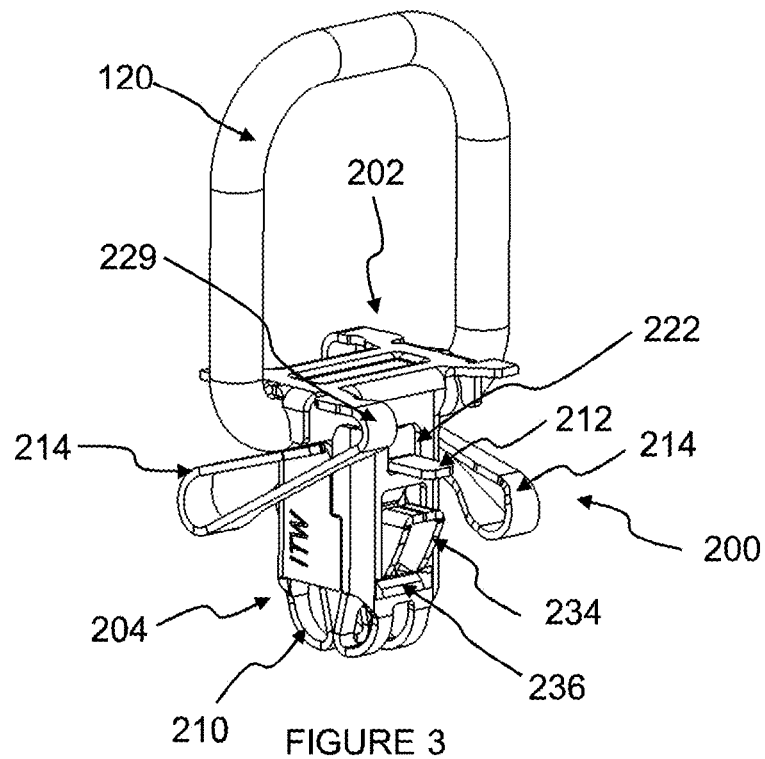
FIG. 3 shows a perspective view of an example embodiment of the fastening clip of the present disclosure.
Figure 4:
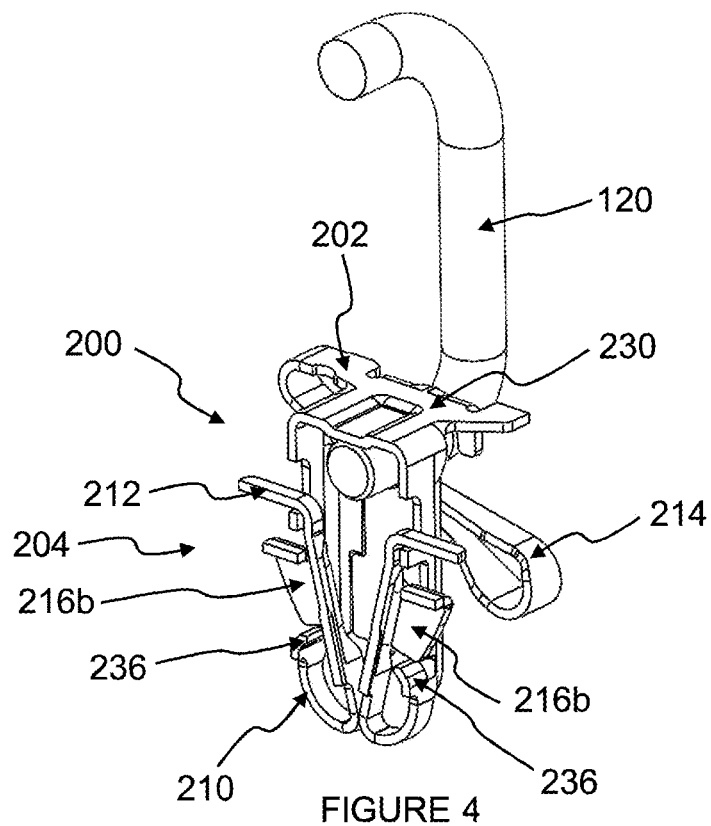
FIG. 4 is a perspective cross-section view of the fastening clip shown in FIG. 3.
Figure 5:
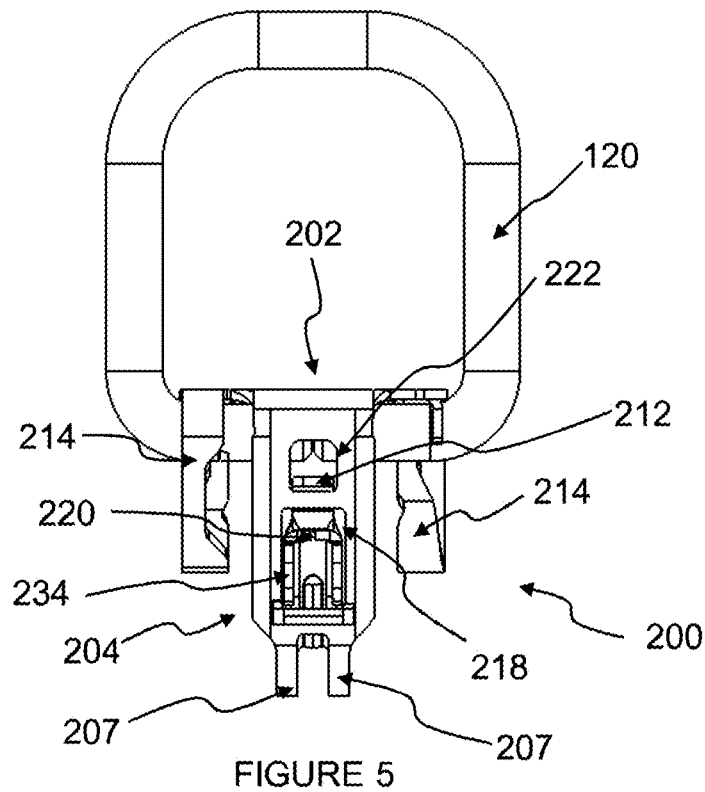
FIG. 5 is a front view of the fastening clip shown in FIG. 3.

An example of such a fastener clip 100, to which a luggage ring 120 is connected, is shown in FIG. 2. The body 104 of the fastening clip 100 is integrally formed with a head 102. The head 102 has an opening on its top surface, on which are provided mechanical stops 114 on opposite sides. These mechanical stops 114 act as a guide to secure the luggage ring 120 to the fastening clip 100. The head 102 of the fastening clip 100 has holding arms 112 integral with and extending from opposite corners. The holding arms 112 are in contact with and partially surround the luggage ring 120 when the luggage ring 120 is secured to the fastening clip 100. This allows the luggage ring 120 to be maintained in a desired position by friction during use, such as in the upstanding position shown in FIG. 2.

The body 104 of the fastening clip 100 is provided with openings on the sides. The openings provide access for parts of the fastening clip 100 to extend through from the inside of the body 104 through to the outside. More specifically, the fastening clip 100 is provided with a pair of oppositely protruding resilient arms 110 extending through a respective pair of opposite upper openings in the body 104. The resilient arms 110 laterally protrude in a direction parallel to an upper surface of the head 102. The fastening clip 100 is also provided with a pair of oppositely protruding shoulders 108 extending through a respective pair of opposite lower openings in the body 104. The resilient arm 110 and shoulder 108 on each side are integrally formed. At an end away from the head 102, the fastening clip 100 is provided with legs 106 for insertion into a panel structure, in order to secure the fastening clip 100 to the support structure.

There is also a desire to increase the pull-out force which fastening clips, such as clip 100, can withstand in order to prevent undesired removal when a load is applied to the luggage ring and in order to prevent unwanted damage to the panel to which the luggage ring is attached.

It is an object of the present disclosure to provide an improved fastening clip, suitable for attaching airbags, such as side-impact or curtain airbags, or luggage rings to a vehicle structure, that is robust and efficient, as well as, ergonomic and safe so as to minimize the risk of accidental removal of the fastening clip and/or damage to panels in which the fastening clip is inserted.

Referring now to FIGS. 3 to 9, an example embodiment of a fastening clip 200 of the present disclosure is shown. The fastening clip 200 is connected to a luggage ring 120. The fastening clip 200 is of the type formed by a pre-cut 2D blank (patterned and cut for folding). The fastening clip 200 has a body, or body portion, 204 which is integrally formed with a head, or head portion, 202.

Fastening clips 200 such as those according to this disclosure are inserted into an opening made in the surface of an attachment panel (not shown). This surface effectively divides the clip 200 into an upper outer part, i.e. the head portion 202, which is not inserted into the opening and an inner lower part, i.e. the body portion 204, which is inserted into the opening. The upper part or head portion 202 of the clip 200 corresponds to the outer part and the lower part or body portion 204 of the clip 200 corresponds to the inner part. Likewise, the ascending direction is from the inner part to the outer part (lower to upper) and the descending direction is from the outer part to the inner part (upper to lower).

The body 204 comprises elastically deflectable retaining member in the form of descending tangs 210, which give rise to different structures of the clip, such as, for example, legs 207, resilient arms 212, U-shaped limbs 234 and mechanical stops 236.

The body 204 is formed by a box 206 that is formed by the union of two surfaces which are approximately "U"-shaped in transverse cross-section, being attached by one of their ends, and the attachment being strengthened by respective tabs 208 produced by division of the portions of the connecting part forming opposite surfaces. As may be seen from the attached figures, tabs 208 which are located within box 206 may have nails (not shown) that are shaped so as to engage in the openings provide in box 206. The body 204 has a central, or longitudinal, axis 228.

The descending tangs 210 have an inclination towards the central, or longitudinal, axis 228 of the clip and extend downwards from box 206 towards the center of clip 200 to then form loops or legs 207 and extend away from the center of the clip 200. In the preferred construction of the disclosure and as illustrated in the drawings, the loops, or legs 207, of tangs 210 may be in contact with each other. This contact provides strength to the clip against pull-out forces.

The descending tangs 210 also give rise to a pair of oppositely protruding resilient arms 212 which are configured to emerge from the inner part of box 206 towards the exterior of the same, through a respective pair of openings or windows 222 made in the surface of the box 206. The resilient arms 212 laterally protrude in a direction parallel to an upper surface of the head 202.

Figure 6:
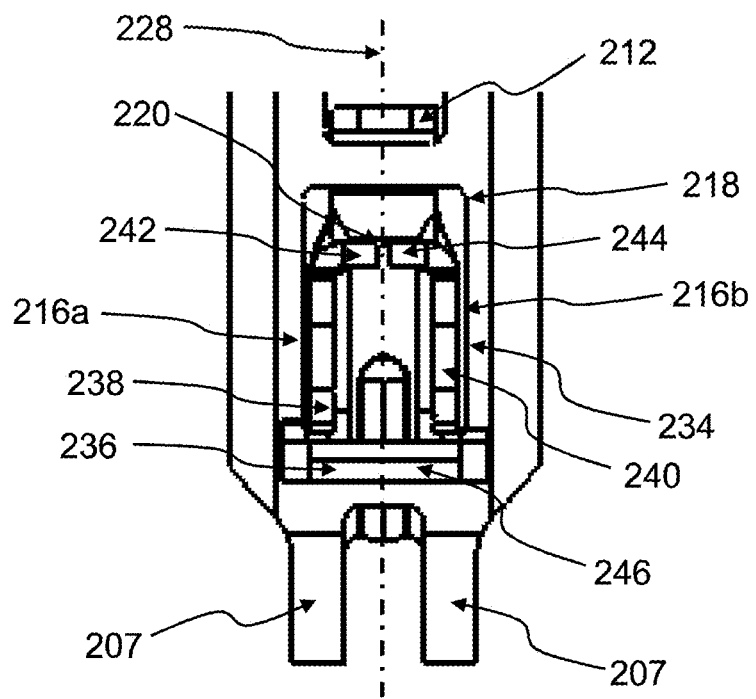
FIG. 6 is a partial front view of the fastening clip show in FIG. 3.
Figure 7:
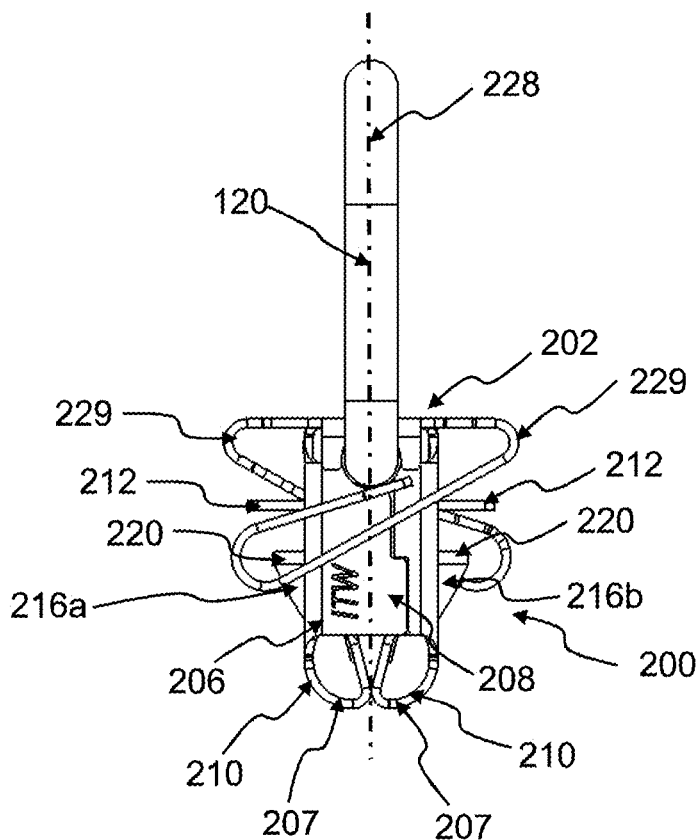
FIG. 7 is a side view of the fastening clip shown in FIG. 3.
Figure 8:
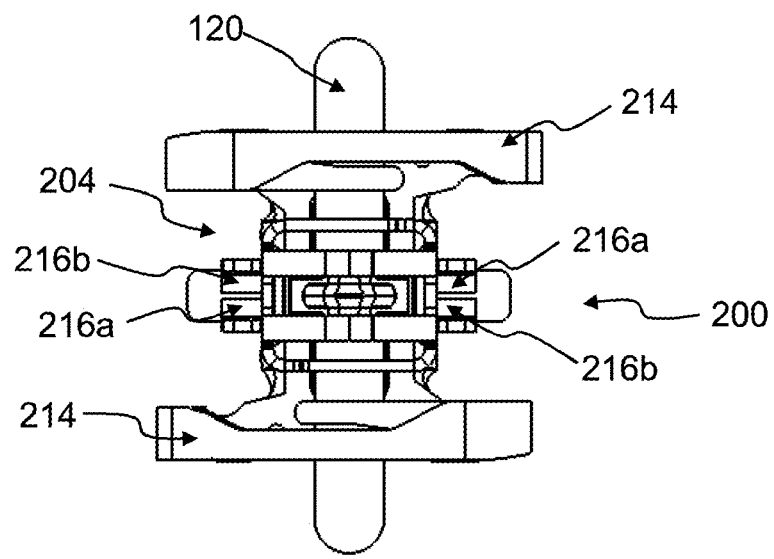
FIG. 8 is a bottom view of the fastening clip shown in FIG. 3.
Figure 9:
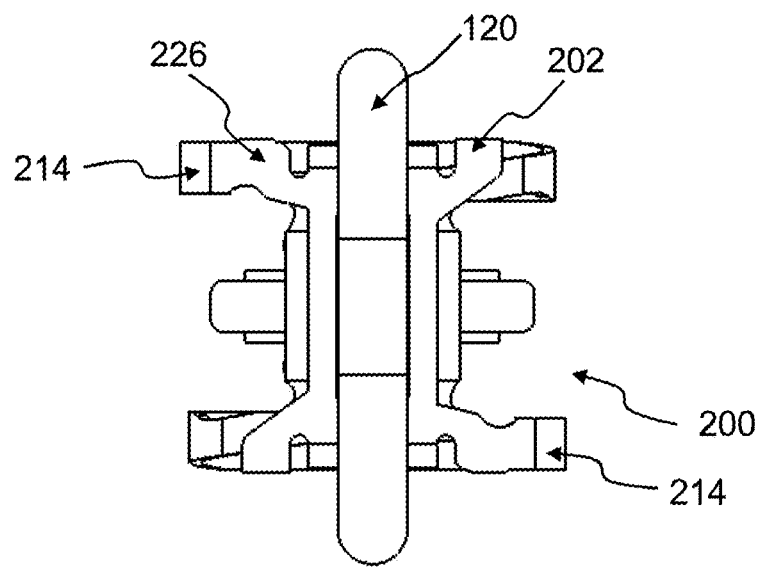
FIG. 9 is a top view of the fastening clip shown in FIG. 3.

A U-shaped limb 234 also extends from each of the descending tangs 210. With particular reference to FIG. 6, each U-shaped limb 234 includes a first portion 238 extending in a generally longitudinal plane relative to said longitudinal axis 228, a second portion 240 spaced apart from the first portion 238 and extending in a generally longitudinal plane relative to said longitudinal axis 228 and a third portion 242 extending from the first portion 238 in a transverse plane relative to said longitudinal axis 228. The first portion 238 and the third portion 242 define a first L-shaped limb portion 216a. In the illustrated embodiment, the U-shaped limb 234 also has a fourth portion 244. The fourth portion 244 extends from the second portion 240 in a transverse plane relative to said longitudinal axis 228. The second portion 240 and the fourth portion 244 define a second L-shaped limb portion 216b. The third portion 242 and the fourth portion 244 lie in the same transverse plane. In other words, the transverse plane of the third portion 242 and the transverse plane of the fourth portion 244 is a common plane.

The U-shaped limbs 234 are also configured to emerge from the inner part of box 206 towards the exterior of the box 206, through a respective opening or window 218 made in its surface. In use, the first and second L-shaped limb portions 216a, 216b face each other to form the U-shaped limb 234. The third portion 242 and the fourth portion 244 together define a bearing surface 220, against which the support structure bears in use. In other words, the base of the U-shaped limb 234 defines the bearing surface 220.

The descending tangs 210 also give rise to a pair of mechanical stops, or stop members 236. Each of the stop members 236 includes a sloped wall 246 which extends from the lower end region of the body toward the respective opening or window 218 in the body 204. The stop members 236 are positioned within the box 206 and are not configured to emerge from the inner part of box 206.

The head 202 includes a substantially rectangularly shaped plate 226 with a flat upper surface. The plate 226 is arranged transverse to the longitudinal axis 228 of the body portion 204. Resilient spring elements 214 (i.e. flexion legs) extend transversely away from opposing edges at diagonally opposing corners of the plate 226. Each spring element 214 is folded towards the body portion 204, so as to form an obtuse angle with the flat upper surface of the plate 226. The fold of the spring elements 214 forms a rounded side edge 229 of the plate 226. Further, a distal end portion of each spring element 214 is looped back, so as to form a rounded spring element end (i.e. a tear-drop hem).

A central portion 230 of two opposing protruding side edges of the plate 226 is folded towards and merged into a respective side of the body portion 204 (i.e. forming the box 206), so as to form a rounded side edge (e.g. a closed or open hem).

The clip 200 may be formed from a single laminar surface (i.e. a sheet material or blank) that is cut and punched in a unique way, so as to allow forming a three-dimensional embodiment of the clip 200 by simply folding respective cut or punched portions of the sheet material at predetermined fold lines. In particular, the laminar surface (i.e. sheet material or blank) may be a sheet metal blank comprising predetermined cuts, bends and apertures that when folded form the specific parts and portions of the three-dimensional clip 200. The sheet metal material may be cut, punched, stamped or bent utilising suitable tooling (e.g. press, drills, laser cutting etc.).

The laminar surface or sheet metal blank may be made from a metal, such as, for example, carbon steel which has been heat treated to impart improved strength qualities to it. Further, clip 200 may undergo treatment to prevent corrosion and/or receive a suitable coating in order to improve its service life and wear in relation to dust, moisture and other elements which might attack the clip 200.

During assembly, the user simply pushes the fastening clip 200 into the mounting aperture (not shown) of the attachment panel (not shown) thus fixingly engaging the resilient arms 212 within an inner surface of the attachment panel (not shown). The legs 207 are inserted into the aperture (not shown). In order to hold the fastening clip 200 in place inside the panel, the resilient arms 212 and the U-shaped limbs 234 are elastically and resiliently biased outwards. When the legs 207 of the fastening clip 200 are inserted into the panel opening, a force is exerted onto the U-shaped limbs 234 and resilient arms 212 to urge the U-shaped limbs 234 and resilient arms 212 inward. When the U-shaped limbs 234 and resilient arms 212 deform inwardly, the fastening clip 200 can fit through the opening of the panel. After the U-shaped limbs 234 and resilient arms 212 are inserted through and clear the opening of the panel, force is no longer exerted onto these components by the panel. The U-shaped limbs 234 and resilient arms 212 bias back outward beyond the width of the opening, holding the fastening clip in place and preventing removal.

The panel is thus sandwiched between the bearing surfaces 220 of the U-shaped limbs 234 and the spring elements 214.

If removal of the fastening clip 200 is required, a user can push the resilient arms 212 inward. This results in the U-shaped limbs 234 being pulled inward (toward the inside of the box 206) and thus the fastening clip 200 can be pulled through the opening in the panel and removed.

The arrangement of the U-shaped limbs 234 has been found to increase the force, e.g. the pull-out force, required to remove the fastening clip 200 from the aperture or opening in the panel without using the resilient arms 212 (i.e. unwanted or undesirable removal of the fastening clip 200).

The stop member 236 limits or restricts downward movement of the U-shaped limbs 234. The arrangement of the stop member 236 has advantageously been found to increase the pull-out force of the fastening clip without hindering insertion of the fastening clip into an aperture in a panel.

Figure 10:
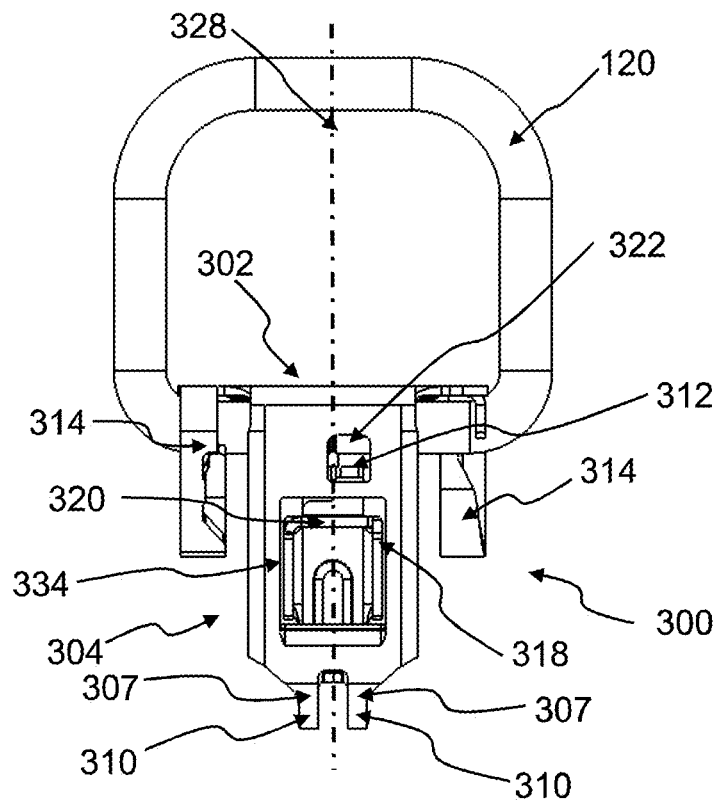
FIG. 10 is a front view of a fastening clip according to an alternative embodiment of the present disclosure.
Figure 11:
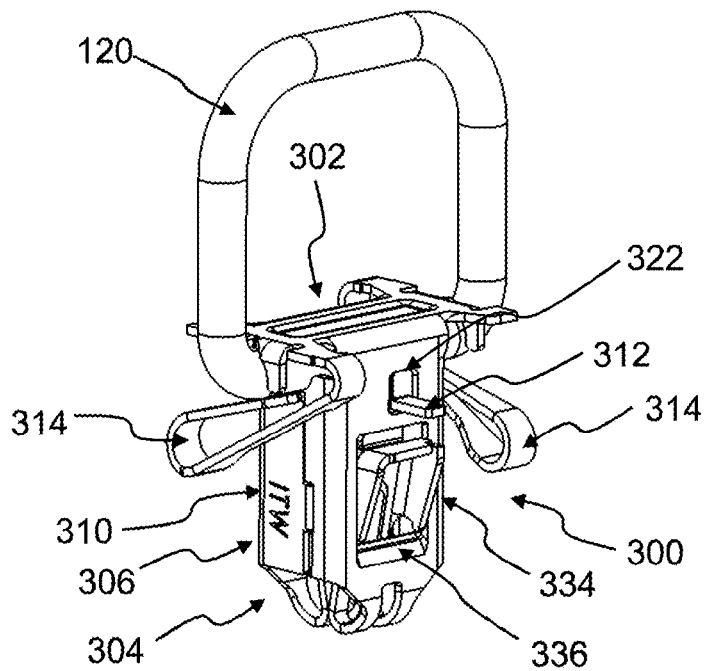
FIG. 11 is a perspective view of the fastening clip of FIG. 10.
Figure 12:
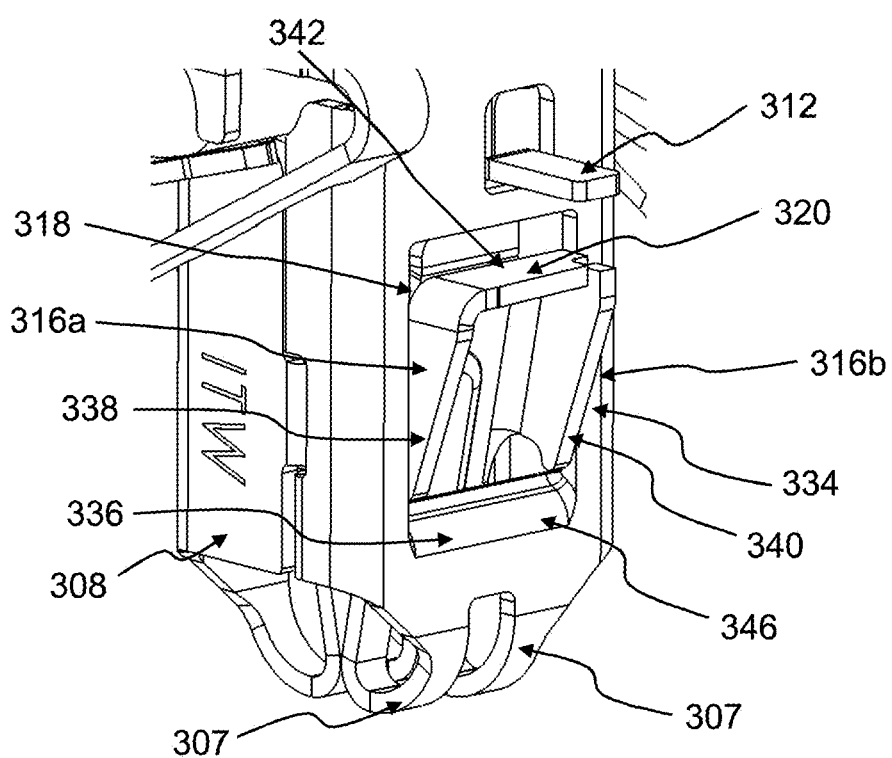
FIG. 12 is a partial perspective view of the fastening clip of FIG. 10.

Referring now to FIGS. 10 to 12, an alternative embodiment of a fastening clip 300 of the present disclosure is shown. The fastening clip 300 is connected to a luggage ring 120. The fastening clip 300 is of the type formed by a pre-cut 2D blank (patterned and cut for folding). The fastening clip 300 has a body, or body portion, 304 which is integrally formed with a head, or head portion, 302.

Fastening clips 300 such as those according to this disclosure are inserted into an opening made in the surface of an attachment panel (not shown). This surface effectively divides the clip 300 into an upper outer part, i.e. the head portion 302, which is not inserted into the opening and an inner lower part, i.e. the body portion 304, which is inserted into the opening. The upper part or head portion 302 of the clip 300 corresponds to the outer part and the lower part or body portion 304 of the clip 300 corresponds to the inner part. Likewise, the ascending direction is from the inner part to the outer (lower to upper) and the descending part is from the outer part to the inner (upper to lower).

The body 304 comprises elastically deflectable retaining members in the form of descending tangs 310, which give rise to different structures of the clip, such as, for example, legs 307, resilient arms 312, U-shaped limbs 334 and mechanical stops 336.

The body 304 is formed by a box 306 that is formed by the union of two surfaces which are approximately "U"-shaped in transverse cross-section, being attached by one of their ends, and the attachment being strengthened by respective tabs 308 produced by division of the portions of the connecting part forming opposite surfaces. As may be seen from the attached figures, tabs 308 which are located within box 306 may have nails (not shown) that are shaped so as to engage in the openings provide in box 306. The body 304 has a central, or longitudinal, axis 328.

The descending tangs 310 have an inclination towards the central, or longitudinal, axis 328 of the clip and extend downwards from box 306 towards the center of clip 300 to then form loops or legs 307 and extend away from the center of the clip 300. In the preferred construction of the disclosure and as illustrated in the drawings, the loops, or legs 307, of tangs 310 may be in contact with each other. This contact provides strength to the clip against pull-out forces.

The descending tangs 310 also give rise to a pair of oppositely protruding resilient arms 312 which are configured to emerge from the inner part of box 306 towards the exterior of the same, through a respective pair of openings or windows 322 made in the surface of the box 306. The resilient arms 312 laterally protrude in a direction parallel to an upper surface of the head 302.

A U-shaped limb 334 also extends from each of the descending tangs 310. With particular reference to FIG. 12, each U-shaped limb 334 includes a first portion 338 extending in a generally longitudinal plane relative to said longitudinal axis 328, a second portion 340 spaced apart from the first portion 338 and extending in a generally longitudinal plane relative to said longitudinal axis 328 and a third portion 342 extending from the first portion 338 in a transverse plane relative to said longitudinal axis 328. The first portion 338 and the third portion 342 define an L-shaped limb portion 316a. The second portion 340 defines an I-shaped limb portion 316b.

The U-shaped limbs 334 are also configured to emerge from the inner part of box 306 towards the exterior of the box 306, through a respective opening or window 318 made in its surface. In use, the L-shaped limb portion 316a faces the I-shaped limb portion 316b to form the U-shaped limb 334. In other words, the L-shaped limb portion 316a and the I-shaped limb portion 316b together define the U-shaped limb 334. The third portion 342 defines a bearing surface 320, against which the support structure bears in use. In other words, the base of the U-shaped limb 334 defines the bearing surface 320.

The descending tangs 310 also give rise to a pair of mechanical stops, or stop members 336. Each of the stop members 336 includes a sloped wall 346 which extends from the lower end region of the body 304 toward the respective opening or window 318 in the body 304. The stop members 336 are positioned within the box 306 and are not configured to emerge from the inner part of box 306.

The head 302 is configured in the same way as the head 302 as described above with reference to FIGS. 3 to 9. Resilient spring elements 314 (i.e. flexion legs) extend transversely away from opposing edges at diagonally opposing corners of the head 302. Each spring element 314 is folded towards the body portion 304, so as to form an obtuse angle with the flat upper surface of the head 302. The fold of the spring elements 314 forms a rounded side edge of an upper surface of the head 302. Further, a distal end portion of each spring element 314 is looped back, so as to form a rounded spring element end (i.e. a tear-drop hem).

The clip 300 may be formed from a single laminar surface (i.e. a sheet material or blank) that is cut and punched in a unique way, so as to allow forming a three-dimensional embodiment of the clip 300 by simply folding respective cut or punched portions of the sheet material at predetermined fold lines. In particular, the laminar surface (i.e. sheet material or blank) may be a sheet metal blank comprising predetermined cuts, bends and apertures that when folded form the specific parts and portions of the three-dimensional clip 300. The sheet metal material may be cut, punched, stamped or bent utilizing suitable tooling (e.g. press, drills, laser cutting etc.).

The laminar surface or sheet metal blank may be made from a metal, such as, for example, carbon steel which has been heat treated to impart improved strength qualities to it. Further, clip 300 may undergo treatment to prevent corrosion and/or receive a suitable coating in order to improve its service life and wear in relation to dust, moisture and other elements which might attack the clip 300.

During assembly, the user simply pushes the fastening clip 300 into the mounting aperture (not shown) of the attachment panel (not shown) thus fixingly engaging the resilient arms 312 within an inner surface of the attachment panel (not shown). The legs 307 are inserted into the aperture (not shown). In order to hold the fastening clip 300 in place inside the panel, the resilient arms 312 and the U-shaped limbs 334 are elastically and resiliently biased outwards. When the legs 307 of the fastening clip 300 are inserted into the panel opening, a force is exerted onto the U-shaped limbs 334 and resilient arms 312 to urge them inwards. When the U-shaped limbs 334 and resilient arms 312 deform inwardly, the fastening clip 300 can fit through the opening of the panel. After the U-shaped limbs 334 and resilient arms 312 are inserted through and clear the opening of the panel, force is no longer exerted onto these components by the panel. The U-shaped limbs 334 and resilient arms 312 bias back outward beyond the width of the opening, holding the fastening clip in place and preventing removal.

The panel is thus sandwiched between the bearing surfaces 320 of the U-shaped limbs 334 and the spring elements 314.

If removal of the fastening clip 300 is required, a user can push the resilient arms 312 inward. This results in the U-shaped limbs 334 being pulled inward (toward the inside of the box 306) and thus the fastening clip 300 can be pulled through the opening in the panel and removed.

The arrangement of the U-shaped limbs 334 has been found to increase the force, e.g. the pull-out force, required to remove the fastening clip 300 from the aperture or opening in the panel without using the resilient arms 312 (i.e. unwanted or undesirable removal of the fastening clip 300).

The stop member 336 limits or restricts downward movement of the U-shaped limbs 334. The arrangement of the stop member 336 has advantageously been found to increase the pull-out force of the fastening clip without hindering insertion of the fastening clip into an aperture in a panel.

Figure 13:
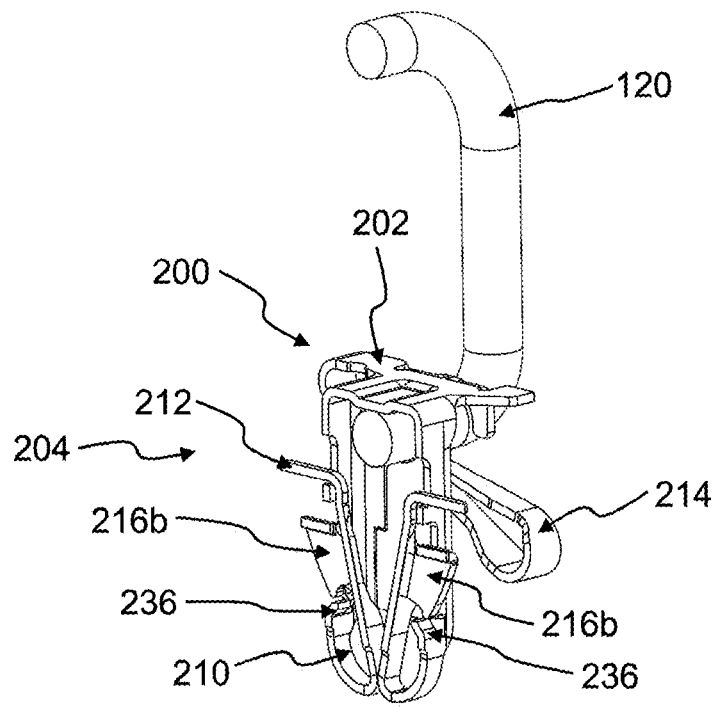
FIG. 13 is an alternative perspective cross-section view of the fastening clip shown in FIG. 3.

A further embodiment of the disclosure will now be described with reference to FIGS. 13 to 15. Features in common with the fastening clip 200 of FIGS. 3 to 9 are depicted with the same reference numbers and will not be described further.

Figure 14:
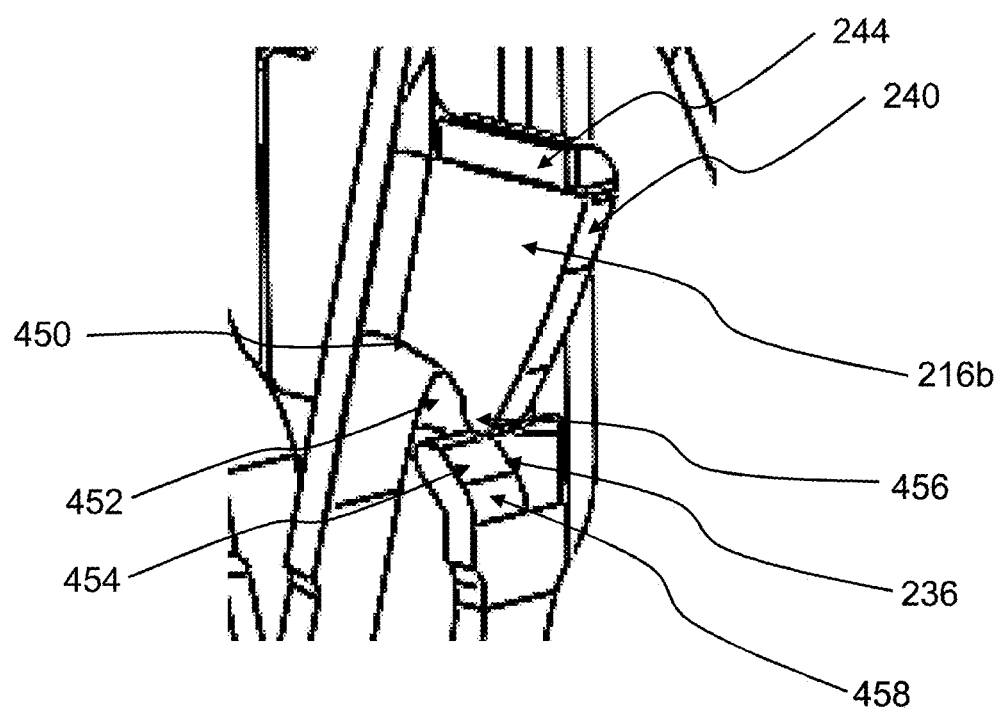
FIG. 14 is an enlarged view of part of the perspective cross-section view of FIG. 13.
Figure 15:
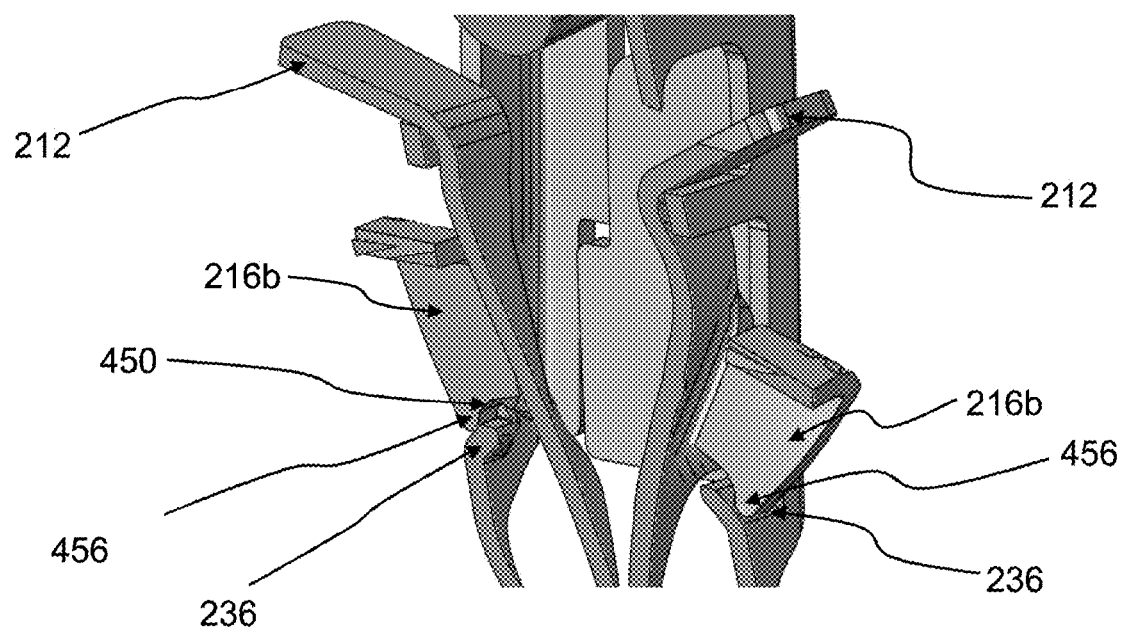
FIG. 15 is a further perspective cross-section view of part of the fastening clip of FIG. 3.

With particular reference to FIGS. 14 and 15, the second portion 240 of the L-shaped limb portion 216b has a lower notch region 450. The lower notch region 450 is adjacent to the stop member 236 and extends upwardly toward the upper end region of the body portion 204 (i.e. toward the head 202 of the fastening clip 200). The lower notch region 450 defines a recess 452, the open end of which is adjacent to the stop member 236. The lower notch region 450 also has a foot 456. The foot 456 is adjacent to the open end of the recess 452 and therefore also the stop member 236. The stop member 236 has a upper portion 454 and a lower portion 458. The recess 452 that is defined by the lower notch region 450 is configured to receive the upper portion 454 of the stop member 236. The foot 456 of the lower notch region 450 is adjacent to the lower portion 458 of the stop member 236 (as shown in FIG. 14).

The first portion 238 of the L-shaped limb portion 216a also includes a lower notch region (not shown). Like the lower notch region 450 of the second portion 240, the lower notch region (not shown) of the first portion 238 defines a recess (not shown) and has a foot (not shown). The recess (not shown) of the lower notch region (not shown) of the first portion 238 is also configured to receive the upper portion 454 of the stop member 236. Similarly, the foot (not shown) of the lower notch region (not shown) of the first portion 238 is adjacent to the lower portion 458 of the stop member 236.

When a force is applied to the luggage ring 120, for example in an upward, or pull-out, direction, the engagement of the stop members 236 with the lower notch regions 450 of the first and second portions 238, 240, and in particular, the abutment of the foot 456 of the lower notch region 450 with the lower portion 458 of the stop member 236 (as shown in FIG. 15) ensures that the two L-shaped limb portions 216a, 216b and therefore the U-shaped member 234 remain on the outside of the body portion 204. Advantageously, this increases the pull-out force that the fastening clip 200 can withstand.

The lower notch regions may also be provided on the first and second portions 338, 340 of the fastening clip 300 in order to increase the pull-out force that the fastening clip 300 can withstand.

In some embodiments of the disclosure, the lower notch regions may only be provided on the first portions 238, 338 or the second portions 240, 340 of the fastening clips 200, 300.

It will be appreciated by persons skilled in the art that the above embodiment(s) have been described by way of example only and not in any limitative sense, and that various alterations and modifications are possible without departing from the scope of the disclosure as defined by the appended claims. The embodiments described are fastening clips to which a luggage ring has been attached. It will be appreciated that the fastening clips described above could be used to secure other paraphernalia and accessories, including air bags.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system is not limited to the particular implementations disclosed. Instead, the present method and/or system will include all implementations falling within the scope of the appended claims, both literally and under the doctrine of equivalents.

What is claimed is:

1. A fastening clip for mounting a component part, such as an airbag or a luggage ring, to a support structure, the fastening clip comprising:
a body portion, extending between an upper end region and a lower end region along a longitudinal axis, wherein the body portion comprises at least one elastically deflectable retaining member projecting laterally from said lower end region of said body portion, so as to fixingly engage when inserted into an orifice of the support structure; and
wherein the at least one elastically deflectable retaining member includes a U-shaped limb that is composed of an L-shaped limb portion and an I-shaped limb portion arranged to form the U-shaped limb, the U-shaped limb comprising a first portion extending in a first generally longitudinal plane relative to said longitudinal axis, a second portion spaced apart from and parallel to the first portion and extending in a second generally longitudinal plane relative to said longitudinal axis and a third portion extending from the first portion in a transverse plane relative to said longitudinal axis, and
wherein the first portion and the second portion are planar.

2. The fastening clip according to claim 1, wherein the body portion includes an opening through which said U-shaped limb extends.

3. The fastening clip according to claim 2, wherein the fastening clip further comprises a stop member.

4. The fastening clip according to claim 3, wherein the stop member includes a sloped wall, wherein the sloped wall extends from the lower end region of the body portion toward the opening.

5. The fastening clip according to claim 1, wherein the third portion extends from the first portion such that the first portion and the third portion define the L-shaped limb portion.

6. The fastening clip according to claim 5, wherein the second portion defines the I-shaped limb portion.

7. The fastening clip according to claim 1, wherein the third portion defines a bearing surface, against which the support structure bears when in use.

8. The fastening clip according to claim 1, further comprising a head portion provided at said upper end region of said body portion, said head portion comprising a plate member, having a flat upper surface extending in a transverse plane relative to said longitudinal axis, wherein said body portion and said head portion are formed from a single piece.

9. The fastening clip according to claim 1, wherein the first generally longitudinal plane and the second generally longitudinal plane are parallel to said longitudinal axis.

10. A fastening clip for mounting a component part, such as an airbag or a luggage ring, to a support structure, the fastening clip comprising:
a body portion, extending between an upper end region and a lower end region along a longitudinal axis, wherein the body portion comprises an opening and at least one elastically deflectable retaining member projecting laterally from said lower end region of said body portion, so as to fixingly engage when inserted into an orifice of the support structure; and
wherein the at least one elastically deflectable retaining member includes a U-shaped limb extending through said opening, the U-shaped limb comprising a first portion extending in a generally longitudinal plane relative to said longitudinal axis, a second portion spaced apart from the first portion and extending in a generally longitudinal plane relative to said longitudinal axis and a third portion extending from the first portion in a transverse plane relative to said longitudinal axis, and
wherein the first portion or the second portion comprises a lower notch region adjacent to a stop member that includes a sloped wall extending from the lower end region of the body portion toward the opening.

11. The fastening clip according to claim 10, wherein the U-shaped limb comprises a fourth portion extending from the second portion in the transverse plane relative to said longitudinal axis.

12. The fastening clip according to claim 11, wherein the transverse plane of the third portion and the transverse plane of the fourth portion is a common plane, and/or wherein the third portion and the fourth portion define a bearing surface, against which the support structure bears, in use.

13. The fastening clip according to claim 10, wherein the lower notch region extends upwardly toward the upper end region of the body portion and defines a recess that is configured to receive an upper portion of the stop member.

14. The fastening clip according to claim 10, wherein the lower notch region includes a foot that is configured to abut a lower portion of the stop member.

15. The fastening clip according to claim 10, further comprising a head portion provided at said upper end region of said body portion, said head portion comprising a plate member, having a flat upper surface extending in a transverse plane relative to said longitudinal axis.

16. A fastening clip for mounting a component part, such as an airbag or a luggage ring, to a support structure, the fastening clip comprising:
a body portion, extending between an upper end region and a lower end region along a longitudinal axis, wherein the body portion comprises an opening and at least one elastically deflectable retaining member projecting laterally from said lower end region of said body portion, so as to fixingly engage when inserted into an orifice of the support structure; and
wherein the at least one elastically deflectable retaining member includes a U-shaped limb extending through said opening, the U-shaped limb comprising a first portion extending in a generally longitudinal plane relative to said longitudinal axis, a second portion spaced apart from the first portion and extending in a generally longitudinal plane relative to said longitudinal axis, a third portion extending from the first portion in a transverse plane relative to said longitudinal axis, and a fourth portion extending from the second portion in the transverse plane relative to said longitudinal axis, wherein the fourth portion extends from the second portion such that the second portion and the fourth portion define a second L-shaped limb portion, and wherein a stop member that includes a sloped wall extends from the lower end region of the body portion toward the opening.

17. The fastening clip according to claim 16, further comprising a head portion provided at said upper end region of said body portion, said head portion comprising a plate member, having a flat upper surface extending in a transverse plane relative to said longitudinal axis.

* * * * *